(12) United States Patent  (10) Patent No.: US 7,982,593 B2
Hsu  (45) Date of Patent: Jul. 19, 2011

(54) ALARM DEVICE OF VEHICLE BATTERY FOR MONITORING VOLTAGE RANGES IN CHARGING AND DISCHARGING PROCESSES OF VEHICLE BATTERY

(75) Inventor: Alan Hsu, Taipei County (TW)

(73) Assignee: Lifetech Energy Inc., Tucheng, Taipei County (TW)

( * ) Notice: Subject to any disclaimer, the term of this patent is extended or adjusted under 35 U.S.C. 154(b) by 364 days.

(21) Appl. No.: 12/243,955

(22) Filed: Oct. 1, 2008

(65) Prior Publication Data

US 2010/0079271 A1   Apr. 1, 2010

(51) Int. Cl.
*B60C 23/00*   (2006.01)

(52) U.S. Cl. ........ 340/455; 340/321; 340/326; 340/473; 340/908.1; 180/65.8; 320/127; 320/128; 320/134; 320/136

(58) Field of Classification Search .................. 340/455, 340/321, 326, 473, 908.1; 180/65.2, 65.4, 180/65.8, 54; 320/127, 128, 134, 136
See application file for complete search history.

(56) References Cited

U.S. PATENT DOCUMENTS

| 6,522,104 | B1 * | 2/2003 | Drori ............................. 320/149 |
| 2007/0153560 | A1 * | 7/2007 | Zhang et al. .................. 363/166 |

* cited by examiner

*Primary Examiner* — Tai T Nguyen
(74) *Attorney, Agent, or Firm* — Muncy, Geissler, Olds & Lowe, PLLC

(57) ABSTRACT

An alarm device of a vehicle battery for monitoring voltage ranges in charging and discharging processes of the vehicle battery uses a sampling circuit to monitor the charging and discharging voltages real time of a battery, and prompts alert through a light or a buzzer of an alert unit in accordance with the preset voltage stage in a charging and discharging process of the battery. Moreover, a connection port compatible to an external electric device for accessing and examining the defect of a malfunction battery as a reference for maintaining and updating a malfunctioned battery.

7 Claims, 6 Drawing Sheets

ALARM DEVICE OF VEHICLE BATTERY FOR MONITORING VOLTAGE RANGES IN CHARGING AND DISCHARGING PROCESSES OF VEHICLE BATTERY

FIELD OF INVENTION

The present invention relates to alarm devices of a usage of a vehicle battery, and in particular to an alarm device for monitoring voltages in charging and discharging of a vehicle battery so as to control the usage of the battery.

DESCRIPTION OF THE PRIOR ART

The efficiency of a battery set will decay with the time of usage, counts of charging and discharging, changing environment, manufacturing defects, and other causes. The decadence of a battery set or the charging unit itself will influence the performance and life time of the battery, so it is important for an electric power device to detect the power supply system thereof and to maintain the best status of the battery.

A prior alarm device of a chargeable battery, referring to a Taiwan Patent No. I261677, relates to a method and a device of battery control. It uses discharging and charging current of the battery as a reference. The charging current value can be calculated by the detection step in charging, and the discharging current value can be calculated by the detection step in discharging. By both of the calculated values of charging and discharging current the, battery is controlled. However, the charging and discharging process are dynamic and variable under vehicle status (which means a load), environment (which means temperatures), the change of inner resistance of the battery, and the power effect of the load. The calculation of charging and discharging current will have a certain level of difference and causes an inaccuracy or an unexpected movement. Beside, the complex calculation and structure is delicate and fragile and also higher cost.

Another Taiwan Patent No. I280397 refers to an automatic test system and method for battery of electronic device. The device controls the charger and discharger by using a program to examine the battery status in a preset area in charging and discharging. The program is within a workstation which is independent from the battery, so it is not timely alert and lack of efficiency.

A further Taiwan Patent No. M312113 is similar to above patent of number I280397, examines the battery status through the wave attitude and period of a wave generator of an external device. However it has the same disadvantage of the patent of numnber I280397 which don't have real time detection and without alert and control function.

SUMMARY OF THE PRESENT INVENTION

Accordingly, the primary object of the present invention is to provide an alarm device for monitoring whether the charging and discharging voltages of a battery are within the preset range.

Another object of the present invention is to lower the error ratio of detection by integrating the battery with the sampling circuit for monitoring the voltages in charging and discharging.

To provide alarm stages such as two step setting values of over-voltage with different alarm status and actions is another object of the present invention.

The technique method of the present invention is described as following:

The present invention discloses an alarm device of a usage of a vehicle battery with a sampling circuit for monitoring the voltage real time in a charging and discharging process of a battery. The alarm device is electrically connected to the battery, and has a power end, a first detecting end for over-current detection to the load and a second detecting end for over-charge detection to the charger. There is also a memory unit which stores standard voltage and the data detected by the first detecting end and the second detecting end.

The present invention of alarm device can provide alerts by light or buzzer in charging and discharging process of the battery with reference to the preset stage voltage values. By the different manners of light and buzzer via different stages, a user can easily tell the status of the battery. Moreover, through a provided USB port compatible to an external device, the memory unit can be accessed to examine the defect of a malfunction battery and use it as a reference to a correction or replacement.

As mentioned above, the present device is integrated with the battery in the same platform, and is a real time alert device and also an efficient device especially to a vehicle battery system.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims. In the present invention, the electric power device of a vehicle is installed with battery set for power supply. The battery set includes a plurality of chargeable batteries (such as Ni-Mh battery, Li-ion battery, Li—Fe battery). The battery set can be charged by a power charger with a steady voltage and a steady current. Furthermore the battery set can discharge to a load under a discharge mode.

Figure 1:
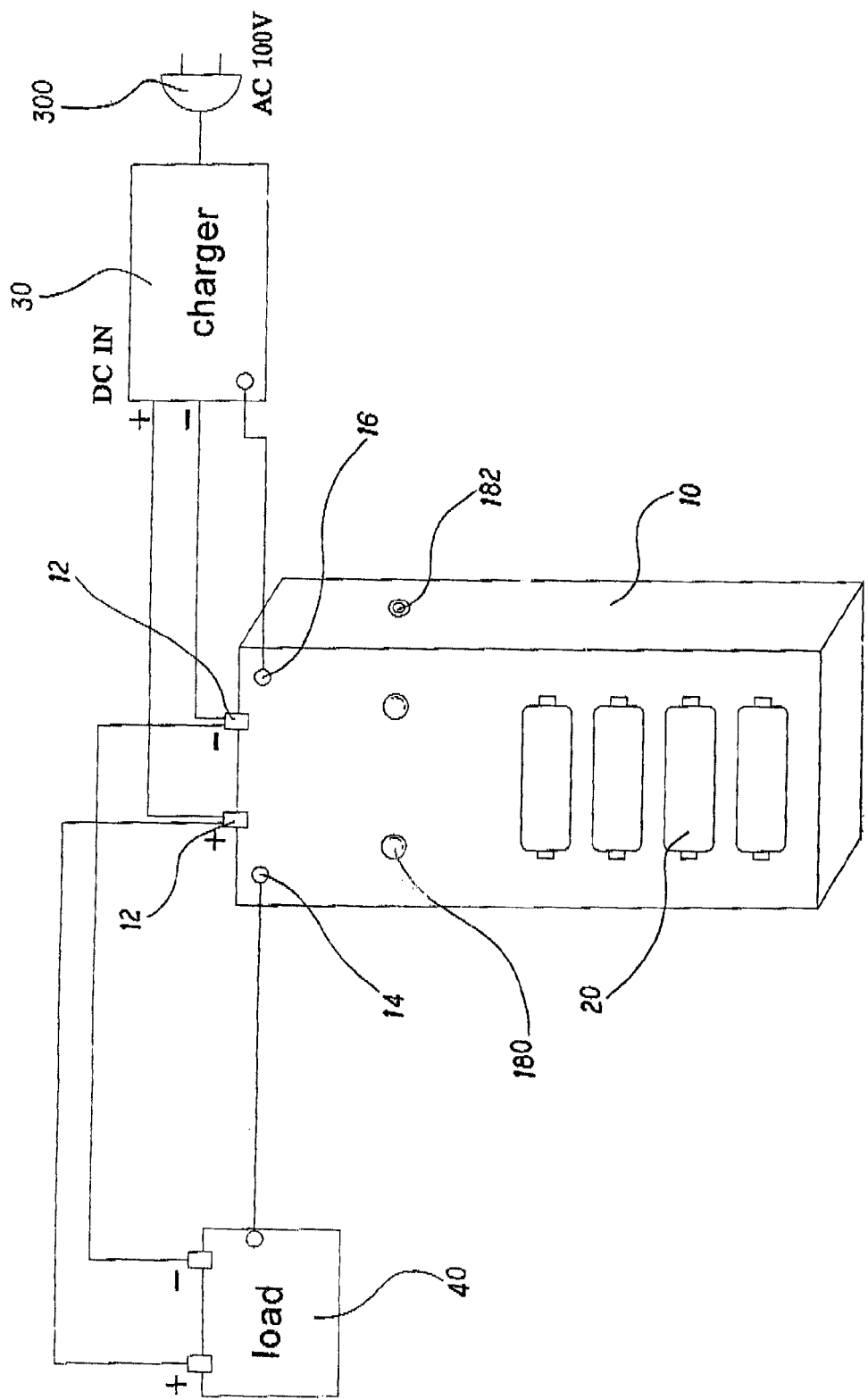
FIG. 1 is a schematic view about usage of the present invention.
Figure 4:
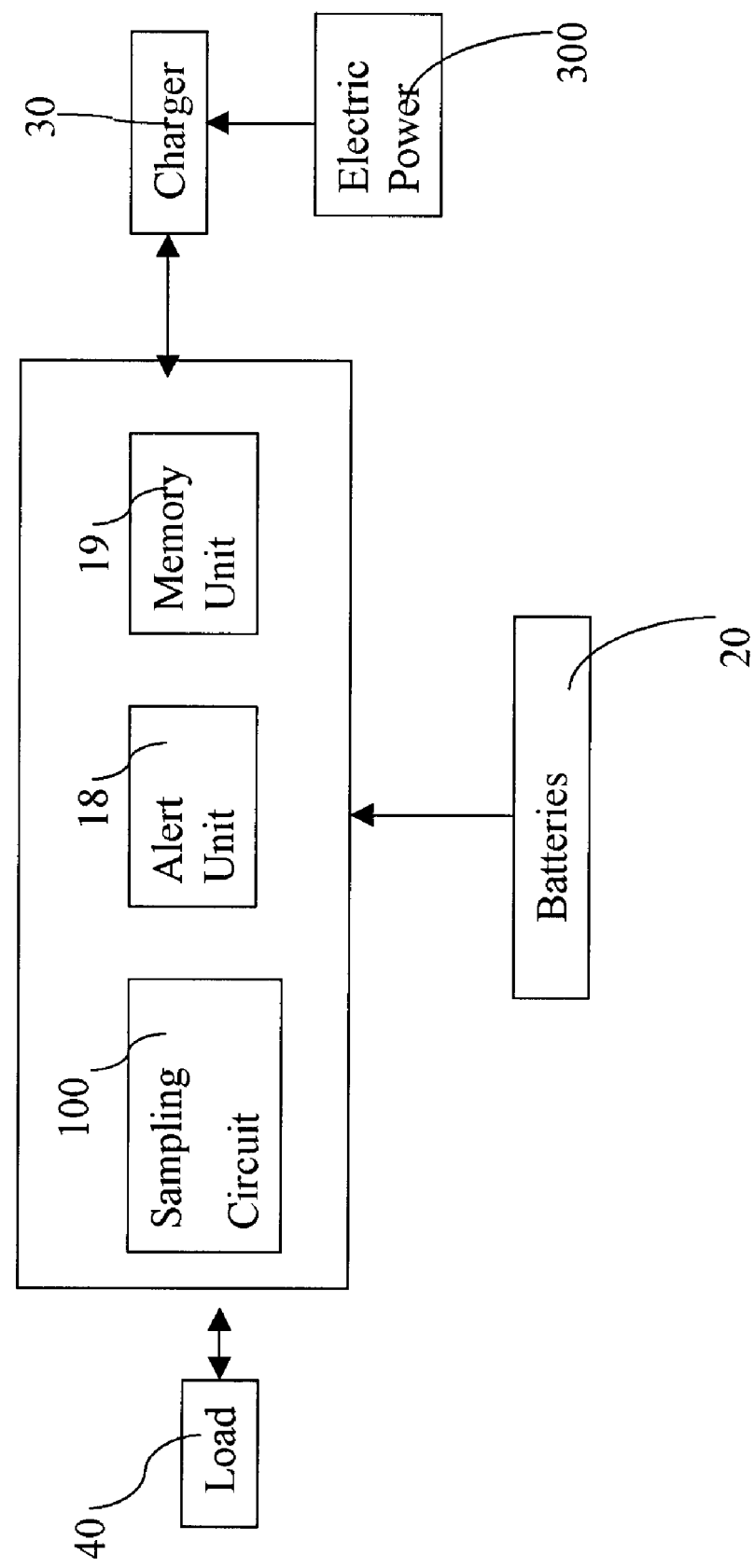
FIG. 4 is a block diagram of the main units of the present invention.

With reference to FIG. 1, a schematic view shows the use of the present invention. An alarm device 10 is electrically connected to at least one battery 20. The alarm device has a set of power end 12 for wiring to a charger 30 and a load 40. The charger 30 receives electric power 300 from public power supply networks and then transfers the received power into direct current (DC) to be stored in the battery 21. Besides, the load 40 receives electric power from the battery 20 and is controlled by other devices for operation. A sampling circuit 100 (referring to FIG. 4) serves for detecting voltages real time and compare the voltages to determine whether the voltages are within permissible ranges for charging and discharging. Moreover the sampling circuit 100 has a first detecting end 14 for over-current detection to the load 40 and a second detecting end 16 for over-charge detection to the charger 30. Thus, the sampling circuit 100 detects the charging voltage/discharging voltage to the battery 20 through the first detection end 14 and the second detecting end 16 real time so as to monitor the voltage range of the battery 20 in charging and discharging. In the process of charging and discharging, the stage setting values for voltage protection are used to cause an alert unit 18 to be actuated by using light emitting diodes 180 or buzzer 182. In that, different stage has different lighting way and buzzing method for being judged easily. The function block diagram in FIG. 4 is helpful to understand the relation of the main components in the alarm device 10. In the pre-alert device of the present invention, the voltage detection and monitoring is based on the charging and discharging of the battery so as to control the use of the battery.

Figure 2:
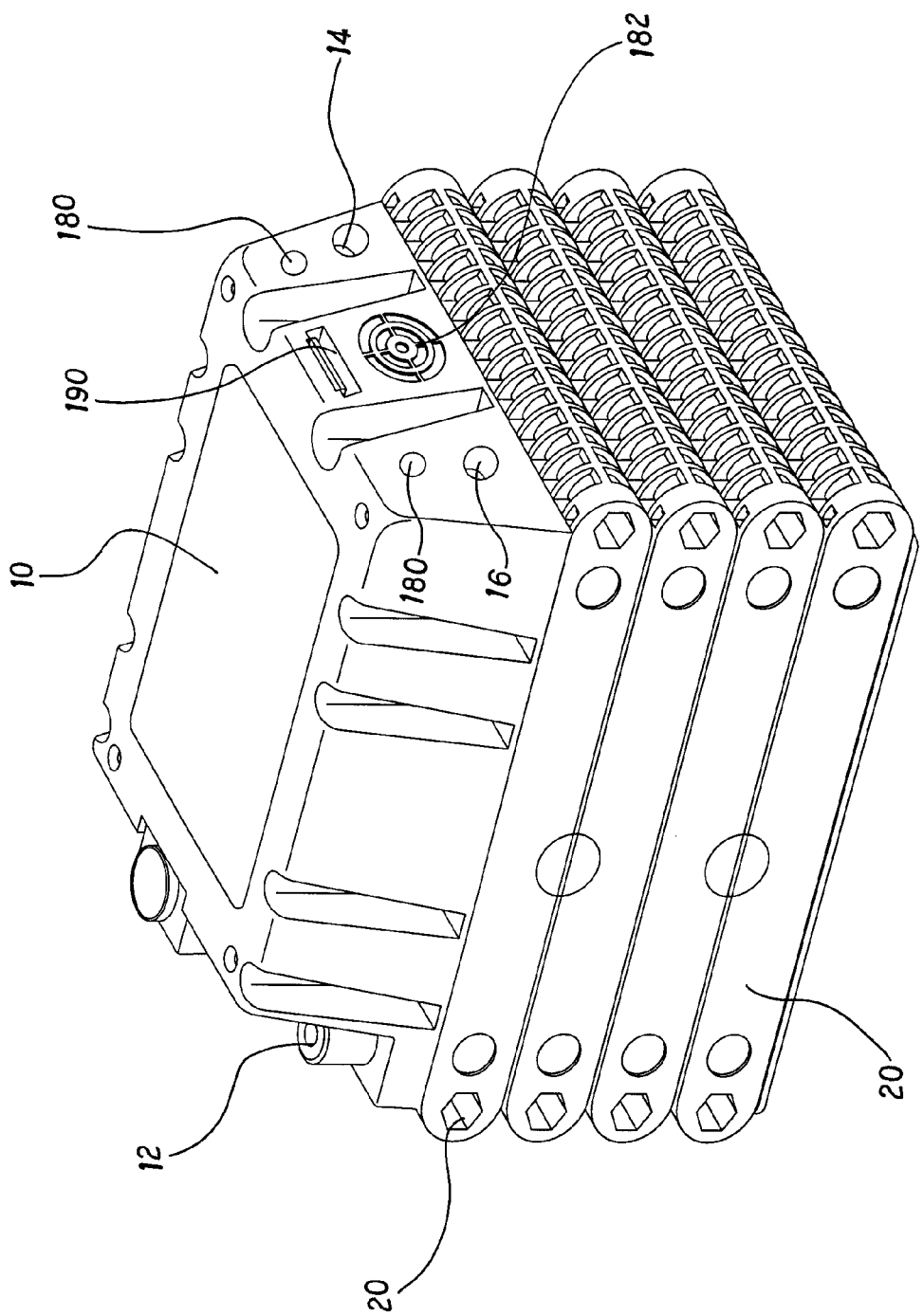
FIG. 2 is a perspective view showing a preferable embodiment of an assembly of a battery and the present invention.
Figure 3:
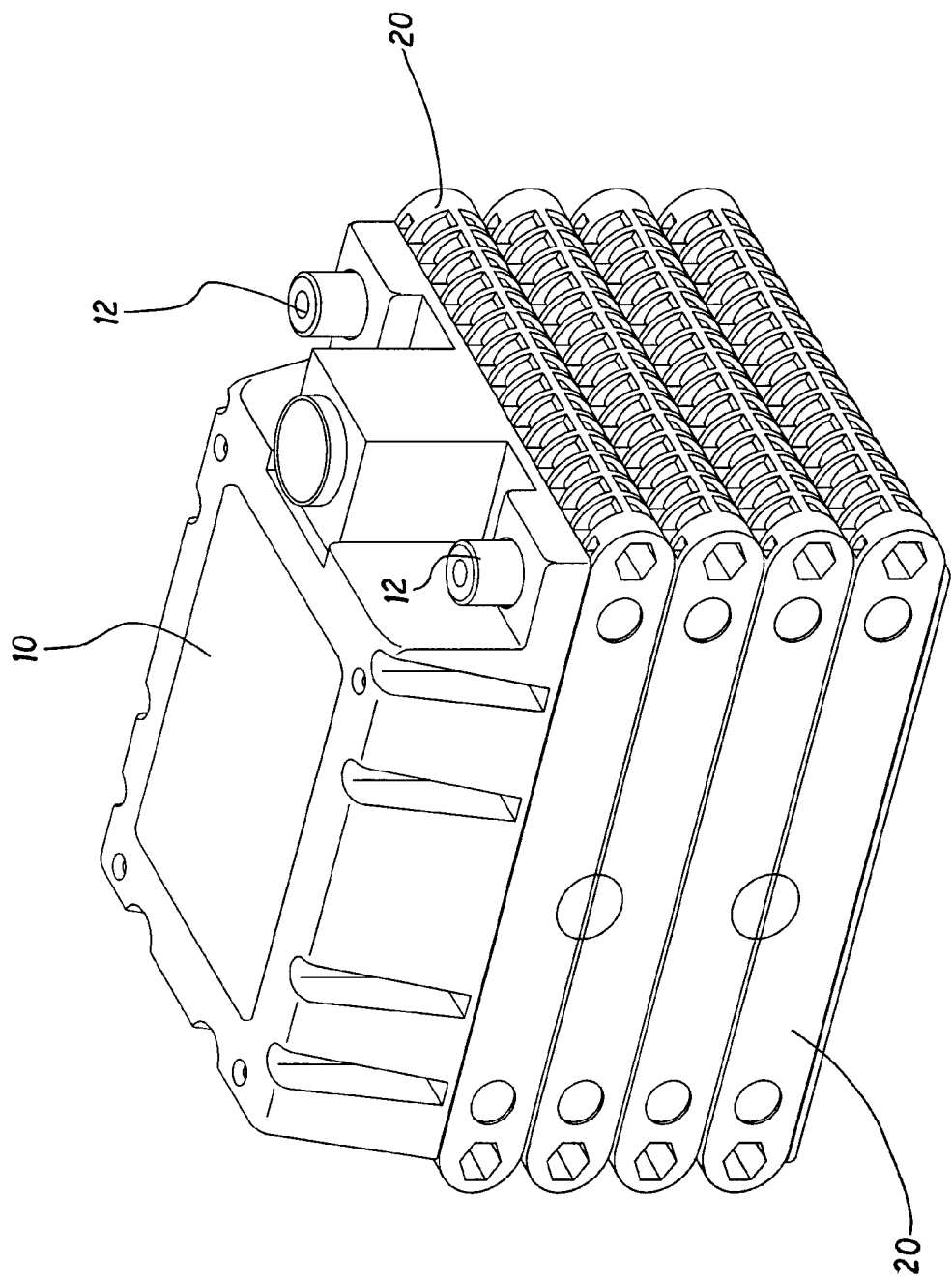
FIG. 3 is a view viewed from a side opposite from that illustrated in FIG. 2.

With reference to a preferable embodiment of the present invention shown in FIGS. 2 and 3, FIG. 2 shows a prospective view of an assembly of the alarm device 10 and batteries 20, while FIG. 3 is a view viewed from a side opposite from that illustrated in FIG. 2. The alarm device 10 is installed to the batteries 20. Other than the set of the power end 12, the first detecting end 14, the second detecting end 16, and the alert unit 18, a built-in memory unit 19 (see FIG. 4) serves to store standard voltage values or the data detected by the first detecting end 14 and the second detecting end 16. Moreover, there is also a set of connection port 190 compatible to external electronic device. As shown in FIG. 2, through an USB port, the memory unit 19 can be accessed to examine the defect of a malfunction battery and use it as a reference to a correction or replacement.

The voltages detected in the process of charging and discharging can be compared with standard voltages set in the device. The comparison is proceeded with the continuous signal. In normal state, the signal will within normal preset range, while a signal out of the preset range will actuate the alert unit 18. As mentioned above, staged setting values for voltage protection is one of the applicable functions of the device, for example, a discharging from the battery 20 to a load 40 under detection by the first detecting end 14 and assuming the the alarm device 10 has an upper limit voltage of 3.9 V/Cell of the first stage and an upper limit voltage of 4.1 V/Cell of the second stage. When the discharging voltage is over the setting value of the first stage, it only actuates the buzzer 182. While the discharging voltage is over the setting value of the second stage, it not only actuates the buzzer 182 but also lights the light emitting diode 180 of the alert unit 18 by a driving signal (such as a TTL signal). By the time the abnormal signal lasts, the light emitting diodes 180 can be set to light continuously, flash, or in different colors to acknowledge the user about the present status. In the same way, a charging from a charger 30 to the battery 20 under detection by the second detecting end 16 can have the same function.

Figure 5:
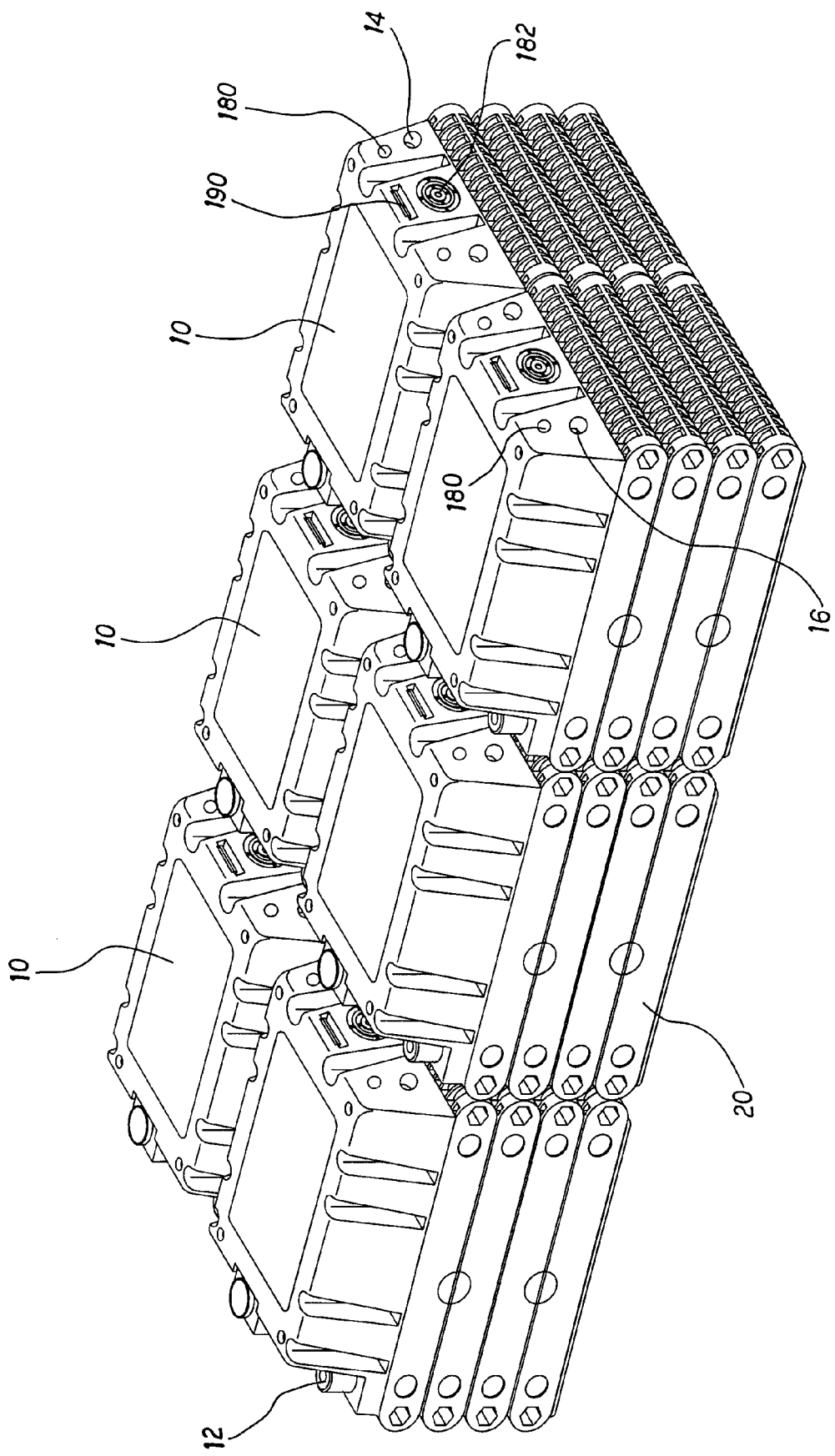
FIG. 5 is a perspective view showing another preferable embodiment about assembly of battery and the present invention.
Figure 6:
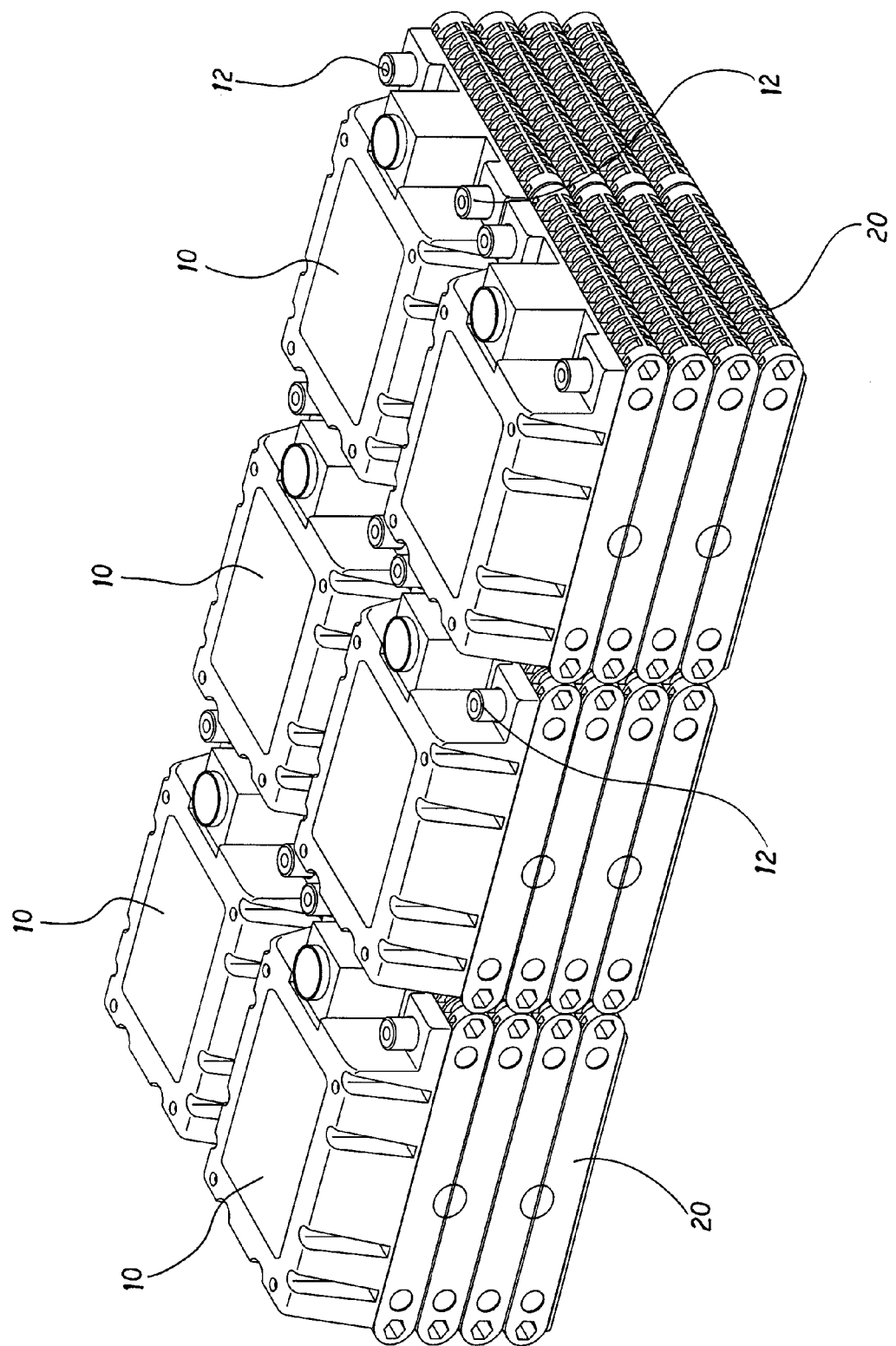
FIG. 6 is a view viewed from a side opposite from that illustrated in FIG. 5.

In another preferable embodiment of the present invention shown in FIG. 5 and 6, where FIG. 5 shows multiple devices of the present invention installed to batteries and FIG. 6 is a view viewed from a side opposite from that shows illustrated in FIG. 5. The alarm devices 10 can be parallel installed to each batteries so that each batteries can be detected by it's own alarm device 10.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An alarm device of a vehicle battery for monitoring voltage ranges in charging and discharging processes of the vehicle battery, comprising:
   an alarm device electrically connected to the vehicle battery (20) and having a power end for wiring to at least one charger (30) and one load (40) respectively, further comprising:
   a sampling circuit having a first detecting end for over-current detection to the load (40) and a second detecting end for over-charge detection to the charger (30); the sampling circuit detecting charging/discharging voltage to the vehicle battery (20) through the first detection end and the second detecting end real time so as to monitor the voltage ranges of the vehicle battery (20) in charging and discharging;
   an alert unit actuated by one of signals from the first detecting end and the second detecting end; and
   wherein above assemblies serve to monitor the voltages in charging and discharging so as to control battery status.

2. The alarm device of a vehicle battery for monitoring voltage ranges in charging and discharging processes of the vehicle battery as claimed in claim 1, further comprising: a memory unit for storage of standard voltage values and data detected by the first detecting end and the second detecting end.

3. The alarm device of a vehicle battery for monitoring voltage ranges in charging and discharging processes of the vehicle battery as claimed in claim 2, further comprising a set of connection ports connectable to an external electronic device for accessing the data of the memory unit and determining a malfunction of the vehicle battery (20) as a reference for maintaining and updating of the malfunctioned vehicle battery (20).

4. The alarm device of a vehicle battery for monitoring voltage ranges in charging and discharging processes of the vehicle battery as claimed in claim 3, wherein the connection port is a USB (universal series bus) connecting port.

5. The alarm device of a vehicle battery for monitoring voltage ranges in charging and discharging processes of the vehicle battery as claimed in claim 2, wherein a preset alert unit will prompt alert in accordance with comparisons between the standard voltage values preset in the memory unit and the voltages detected in the charging and discharging process of the vehicle battery (20).

6. The alarm device of a vehicle battery for monitoring voltage ranges in charging and discharging processes of the vehicle battery as claimed in claim 1, wherein the alert unit is a light emitting diode.

7. The alarm device of a vehicle battery for monitoring voltage ranges in charging and discharging processes of the vehicle battery as claimed in claim 1, wherein the alert unit is a buzzer.

* * * * *